(12) United States Patent
Lackore, Jr. et al.

(10) Patent No.: US 10,774,859 B2
(45) Date of Patent: Sep. 15, 2020

(54) STRIP AND SLOT BONDED JOINT

(71) Applicant: Spartan Fire, LLC, Carson City, NV (US)

(72) Inventors: James Roger Lackore, Jr., Big Bend, WI (US); Scott D. Williamson, Dodge, NE (US)

(73) Assignee: Spartan Fire, LLC, Carson City, NV (US)

( * ) Notice: Subject to any disclaimer, the term of this patent is extended or adjusted under 35 U.S.C. 154(b) by 299 days.

(21) Appl. No.: 15/635,691

(22) Filed: Jun. 28, 2017

(65) Prior Publication Data
US 2019/0003503 A1    Jan. 3, 2019

(51) Int. Cl.
| | | |
|---|---|---|
| *F16B 12/20* | (2006.01) | |
| *F16B 12/46* | (2006.01) | |
| *F16B 5/06* | (2006.01) | |
| *F16B 11/00* | (2006.01) | |
| *F16B 5/00* | (2006.01) | |

(52) U.S. Cl.
CPC .......... *F16B 5/0642* (2013.01); *F16B 5/0028* (2013.01); *F16B 11/006* (2013.01)

(58) Field of Classification Search
CPC .......... F16B 12/12; F16B 12/20; F16B 12/46; F16B 12/10; F16B 12/02; Y10T 403/34; Y10T 403/342; Y10T 403/347; Y10T 403/42; Y10T 403/443; Y10T 403/341; Y10T 403/7096

See application file for complete search history.

(56) References Cited

U.S. PATENT DOCUMENTS

| | | | | |
|---|---|---|---|---|
| 3,145,435 | A | * | 8/1964 | Loetscher ............... F16B 12/02 403/265 |
| 3,214,888 | A | * | 11/1965 | De Ridder ............... B63B 3/16 114/88 |
| 3,380,768 | A | * | 4/1968 | Wolfensberger ... A47B 47/0008 52/280 |
| 3,715,136 | A | * | 2/1973 | Yoshida ................. A47B 87/02 52/285.2 |

(Continued)

FOREIGN PATENT DOCUMENTS

DE    42 11 505    * 7/1993 ............... E06B 3/58

OTHER PUBLICATIONS

Translation of DE 42 11 505. worldwide.espacenet.com. Aug. 7, 2019.*

*Primary Examiner* — Michael P Ferguson
(74) *Attorney, Agent, or Firm* — Michael Best and Friedrich LLP

(57) ABSTRACT

Embodiments of a slot bar configured to secure one or more sheet materials are disclosed herein. The slot bar being configured to receive one or more retaining strips. The slot bar includes a base section and a first slot base extending substantially perpendicularly from the base section. The base section and first slot base define a first ledge region. The slot bar also includes a first slot wall extending from the first slot base and a first slot arm extending from the first slot wall. The first slot arm is also substantially parallel to and spatially disposed from the first slot base. The first slot base, the first slot wall, and the first slot arm define a first slot configured to receive the first retaining strip so as to secure a first sheet material between the first retaining strip and the first ledge region.

12 Claims, 6 Drawing Sheets

(56) References Cited

U.S. PATENT DOCUMENTS

| | | | | |
|---|---|---|---|---|
| 4,271,975 A | * | 6/1981 | Ketner | B65D 88/121 |
| | | | | 217/65 |
| 4,436,343 A | * | 3/1984 | Schneider | A47C 5/12 |
| | | | | 156/163 |
| 4,618,120 A | * | 10/1986 | Wattles | F16B 12/20 |
| | | | | 211/189 |
| 4,840,440 A | * | 6/1989 | Dieter | F16B 12/46 |
| | | | | 217/65 |
| 5,209,597 A | * | 5/1993 | Flaming | F16B 2/22 |
| | | | | 229/122.21 |

* cited by examiner

STRIP AND SLOT BONDED JOINT

FIELD OF THE INVENTION

This invention generally relates to joining of sheets of engineering materials, and more particularly to a joint and method of joining sheets of engineering materials with retaining strips.

BACKGROUND OF THE INVENTION

When fabricating structures using sheet metal parts and extruded shapes, a stronger joint can be created if there are two bonding surfaces at each joint. Put differently, a stronger joint can be created if the sheet is inserted into a slot that contacts both sides of the sheet. For example, as shown in FIG. 8, a joint 100 having slots 102, 104, 106 for joining metal sheets 108 is provided. The slots 102, 104, 106 provide the contact on both sides of the sheet 108, but assembling structures using such a joint 100 can be difficult. For instance, construction of complete box shapes using this method of construction is not practical because of the difficulty in inserting the large sheets 108 into slots 102, 104, 106 in multiple planes.

Embodiments of the presently disclosed invention provide a joint and method of joining sheet materials that are able to overcome the difficulties associated with assembling sheet material constructions using conventional joints, such as those in FIG. 8. These and other advantages of the invention, as well as additional inventive features, will be apparent from the description of the invention provided herein.

BRIEF SUMMARY OF THE INVENTION

In one aspect, embodiments of a slot bar configured to secure one or more sheet materials are disclosed herein. The slot bar is configured to receive one or more retaining strips. The slot bar includes a base section and a first slot base extending substantially perpendicularly from a first region of the base section. The base section and first slot base define a first ledge region. The slot bar also includes a first slot wall extending from the first slot base and a first slot arm extending from the first slot wall. The first slot arm is substantially parallel to and spatially disposed from the first slot base. The first slot base, the first slot wall, and the first slot arm define a first slot configured to receive a first retaining strip so as to secure a first sheet material between the first retaining strip and the first ledge region.

In embodiments, the slot bar also includes a wall section that extends from the base section. The wall section is substantially parallel to and spatially disposed from the first slot wall such that the wall section and the first slot wall define a second slot adapted to receive a second sheet material. In a particular embodiment, the first slot and the second slot are arranged substantially perpendicular to each other. In some embodiments, the base section and the first slot base define a second ledge region. A second slot arm extends from the first slot wall. The first slot base, the first slot wall, and the second slot arm define a second slot adapted to receive a second retaining strip so as to secure a second sheet material between the second retaining strip and the second ledge region.

In still other embodiments, the slot bar can further include a second slot base extending substantially perpendicularly from a second region of the base section in which the second slot base is substantially parallel to and spatially disposed from the first slot base. The base section and second slot base define a second ledge region. A second slot wall extends from the second slot base and is substantially parallel to and spatially disposed from the first slot wall. A second slot arm extends from the second slot wall. The second slot arm is substantially parallel to and spatially disposed from the second slot base. The second slot base, the second slot wall, and the second slot arm define a second slot adapted to receive a second retaining strip so as to secure a second sheet material between the second retaining strip and the second ledge region. The first slot wall and the second slot wall define a third slot adapted to receive a third sheet material.

In embodiments, the first slot and the third slot are arranged at a first angle, and the second slot and the third slot are arranged at a second angle. In such an embodiment, the first angle and the second angle are from 20° to 270°. In a more particular embodiment, the first angle and the second angle are equal. In certain embodiments, the slot bar is an extruded piece.

In another aspect, embodiments of a sheet material construction are provided. The sheet material construction includes two or more sheet materials, at least one retaining strip, and at least one slot bar configured to join at least two of the two or more sheet materials. In such an embodiment, the slot bar includes a base section and a first slot base extending substantially perpendicularly from a first region of the base section. The base section and first slot base define a ledge region. A first slot wall extends from the first slot base, and a first slot arm extends from the slot wall. The first slot arm is substantially parallel to and spatially disposed from the first slot base. The first slot base, the first slot wall, and the first slot arm define a first slot that is configured to secure at least one of the two or more sheet materials. The slot is configured to receive a first retaining strip so as to secure the first sheet material between the first retaining strip and the first ledge region.

In embodiments, the slot bar further comprises a second slot. In a particular embodiment, the two slots are arranged substantially perpendicular to each other. In other particular embodiments, the two slots are coplanar.

In certain embodiments, the second slot is defined by a second slot base extending substantially perpendicularly from a second region of the base section, thereby defining a second ledge region. The second slot is also defined by a second slot wall and a second slot arm. The second slot is configured to receive a second retaining strip so as to secure a second sheet material between the second retaining strip and the second ledge region.

In other embodiments, the slot bar also includes both a second slot and a third slot. In specific embodiments, the first slot and the third slot are arranged at a first angle, and the second slot and the third slot are arranged at a second angle. In such embodiments, the first angle and the second angle are from 20° to 270°. In a more particular embodiment, the first angle and the second angle are equal.

In still other embodiments, the second slot is defined by a second slot base extending substantially perpendicularly from a second region of the base section and defining a second ledge region. Further the second slot is defined by a second slot wall spatially disposed from the first slot wall and a second slot arm. The third slot is defined by the spatial disposition between the first slot wall and the second slot wall. Further, the second slot is configured to receive a second retaining strip so as to secure a second sheet material between the second retaining strip and the second ledge region In certain embodiments of the sheet material construction, an adhesive is applied at at least one of the following locations between the slot arm and the retaining strip, between the retaining strip and the slot base, between the retaining strip and the sheet material, and between the sheet material and the ledge region.

In still another aspect, embodiments of a method for constructing a sheet material construction are provided. The sheet material construction includes a slot bar that is defined by a base section, a first slot base extending substantially perpendicularly from a first region of the base section and defining a first ledge region, a first slot wall, and a first slot arm. The first slot base, the first slot wall, and the first slot arm define a first slot. The method includes the steps of placing a first sheet material on a first ledge region of a slot bar, and inserting a first retaining strip into a first slot of the slot bar such that the first retaining strip secures the first sheet material against the first ledge region.

In embodiments, the method further includes the step of inserting a second sheet material into a second slot of the slot bar that is arranged at an angle of from 20° to 180° with respect to the first slot. In other embodiments, the slot bar is further defined by a second slot base extending substantially perpendicularly from a second region of the base section and defining a second ledge region. Further, the slot bar is defined by a second slot wall and a second slot arm. The second slot base, the second slot wall, and the second slot arm define a second slot. In such an embodiment, the method includes the steps of placing a second sheet material on a second ledge region of the slot bar, and inserting a second retaining strip into a second slot of the slot bar such that the second retaining strip secures the second sheet material against the second ledge region. The method can further include the step of inserting a third sheet material into a third slot of the slot bar that is located between the first slot and the second slot.

Additionally, the method can include the step of applying an adhesive at at least one of the following locations: between the first slot and the first retaining strip, between the first retaining strip and the first sheet material, and between the first sheet material and the first ledge region.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Embodiments of a slot bar for joining sheet materials as well as a method for assembling a sheet material construction are provided herein. Advantageously, the slot bar includes a ledge region upon which a sheet material is placed, and the sheet material is secured in place with a retaining strip that is inserted into a slot in the slot bar. Thus, the disadvantages of inserting a sheet material into a slot are overcome while still providing two contact surfaces for bonding the sheet material to the slot bar. In this way, assembling sheet material constructions that have sheet materials in multiple planes is made easier.

Figure 1:
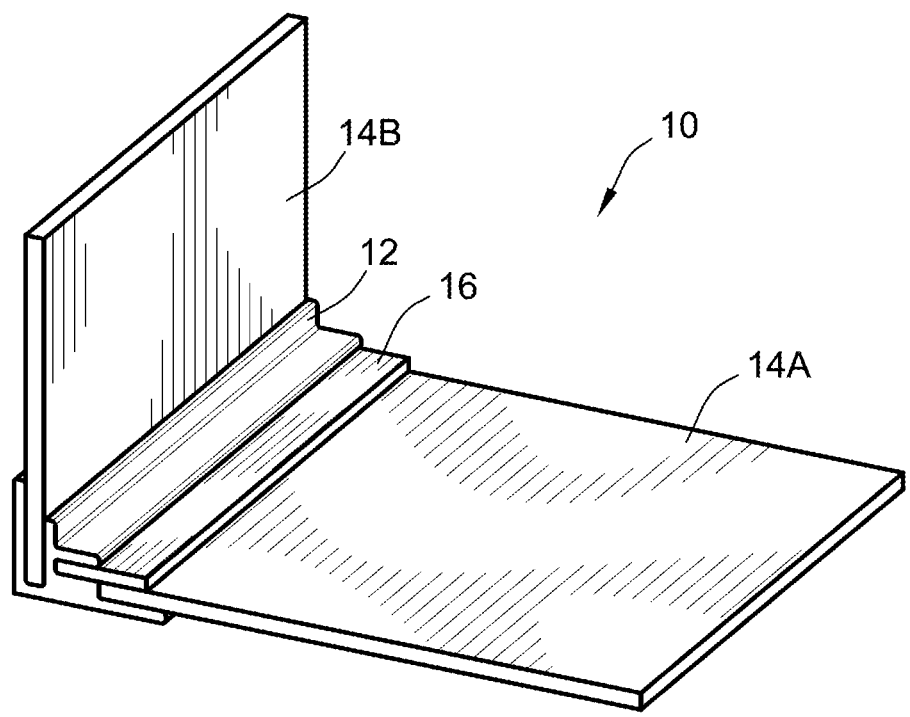
FIG. 1 is an isometric view of a bonded joint, according to an exemplary embodiment.

FIG. 1 depicts a joint 10 that has been assembled using a slot bar 12. As shown in FIG. 1, the slot bar 12 joins two sheet materials 14A, 14B (referred to generally as "sheet material" 14). The sheet material 14 can be made of any of a variety of materials, including metal, wood, plastic, rubber, ceramic, etc. Similarly, the slot bar 12 can be made of any of a variety of materials, including metal, wood, plastic, rubber, ceramic, etc. Moreover, the slot bar 12 and the sheet material 14 can be made of the same or different materials. Preferably, though, the slot bar 12 is made of a material that can be extruded, such as metal or plastic.

In the embodiment shown in FIG. 1, the sheet material 14A is secured to the slot bar 12 with a retaining strip 16. Thus, as shown in FIG. 1, the sheet material 14A is secured between the slot bar 12 and the retaining strip 16 such that two bonding surfaces are provided, i.e., both the top and bottom surfaces of the sheet material 14A are in contact with another surface. Because the sheet material 14A is sandwiched between a surface of the retaining strip 16 and a surface of the slot bar 12, the sheet material 14A will not peel from either surface, which can occur when the sheet material 14A is secured to only a single surface, for instance. Moreover, the retaining strip 16 is secured between two surfaces in the slot bar 12, which helps to ensure that it is secured in its position to secure the sheet material 14A. As with the slot bar 12 and sheet material 14, the retaining strip 16 can be made of any of a variety of materials, including metal, wood, plastic, ceramic, etc. Further, the retaining strip 16 can be made of the same or different material as the slot bar 12 or the sheet material 14.

Figure 2:
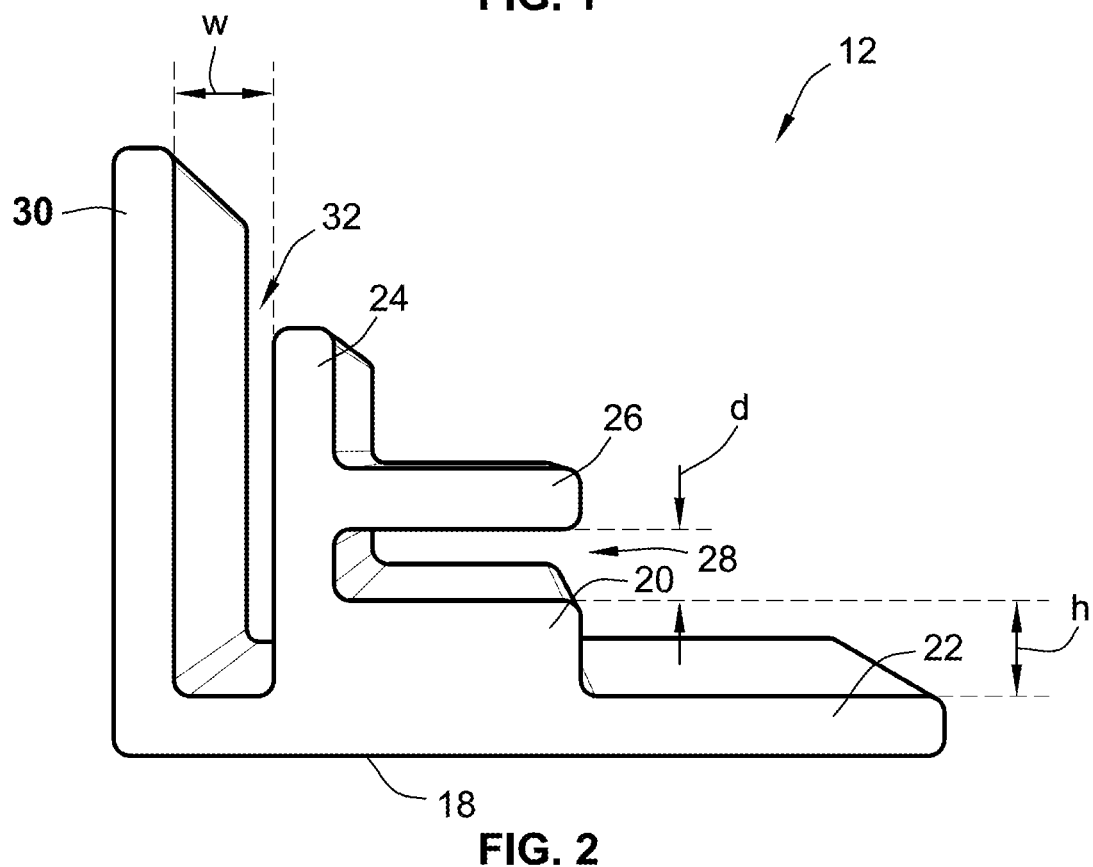
FIG. 2 is a side view of a slot bar for use in constructing a bonded joint, according to an exemplary embodiment.

A more detailed view of the slot bar 12 is provided in FIG. 2. The slot bar 12 includes a base section 18 that is depicted at the bottom of the slot bar 12 (with respect to the orientation of FIG. 2). Extending upwardly from and in a direction substantially perpendicular to the base section 18 is a slot base 20. The base section 18 and slot base 20 define a ledge region 22. Extending upwardly from and in a direction substantially perpendicular to the slot base 20 is a slot wall 24. The slot wall 24 has a slot arm 26 extending substantially perpendicularly therefrom. The slot arm 26 is substantially parallel to the slot base 20 and is spatially disposed from the slot base 20 by a distance d. The slot base 20, the slot wall 24, and the slot arm 26 define a first slot 28 of the slot bar 12. In the embodiment depicted in FIG. 2, the slot bar 12 includes a wall section 30 that is arranged substantially perpendicular to the base section 18. The wall section 30 is spatially disposed from the slot wall 24 so as to define a second slot 32 having a width w. In the embodiment shown in FIG. 2, the first slot 28 and the second slot 32 are substantially perpendicular to each other.

Figure 3:
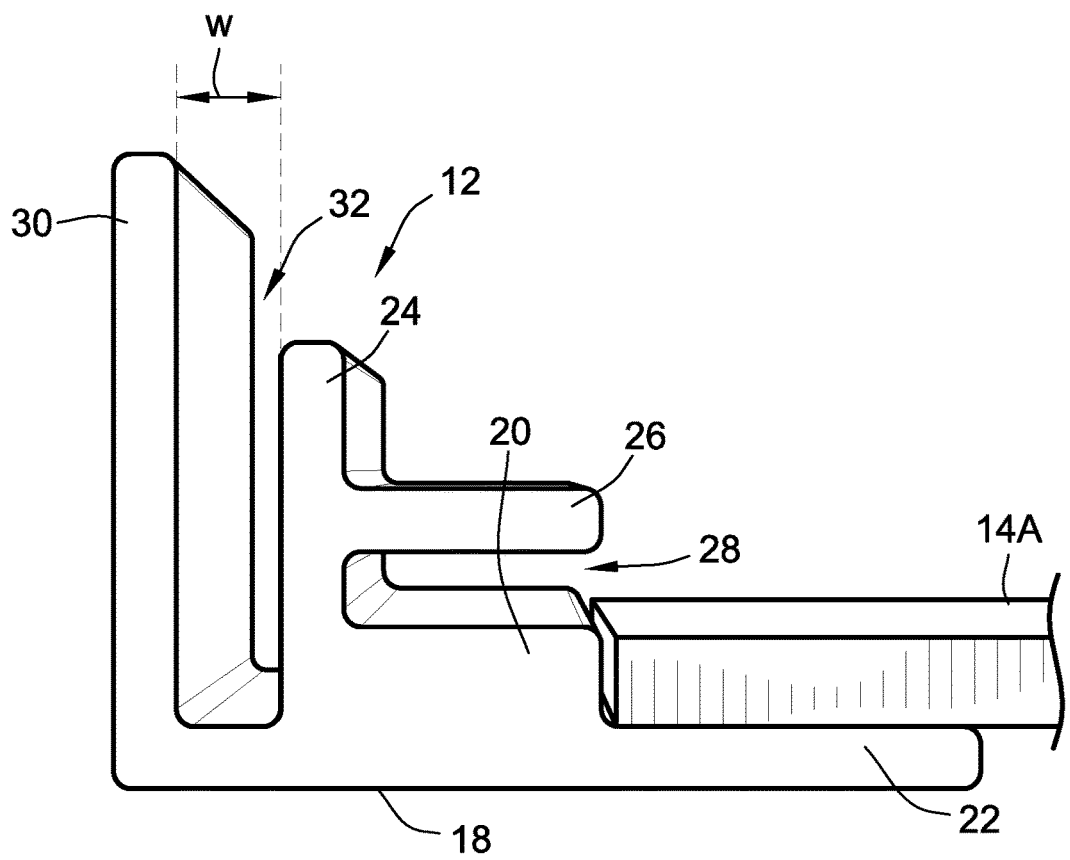
FIG. 3 depicts the slot bar of FIG. 2 with a sheet material located on a ledge region, according to an exemplary embodiment.
Figure 4:
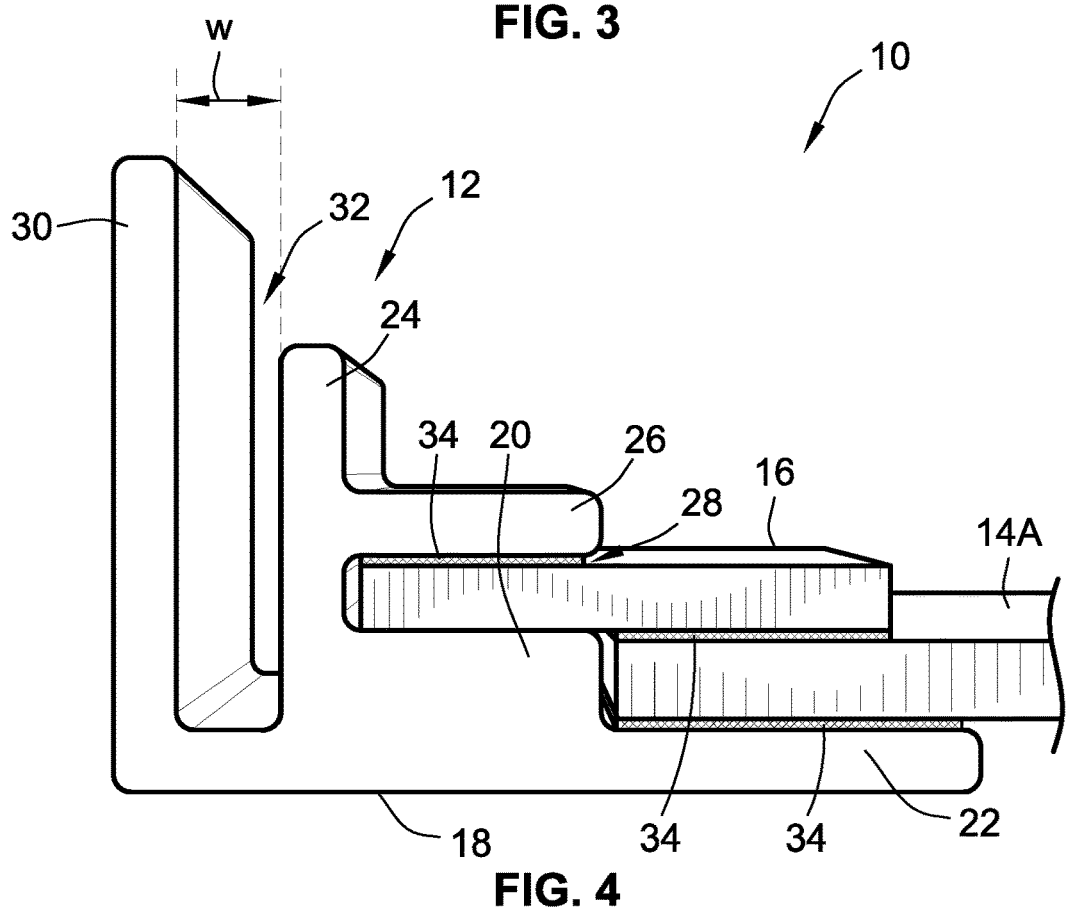
FIG. 4 depicts the slot bar of FIG. 2 with a sheet material and a retaining strip secured with adhesive, according to an exemplary embodiment.
Figure 7:
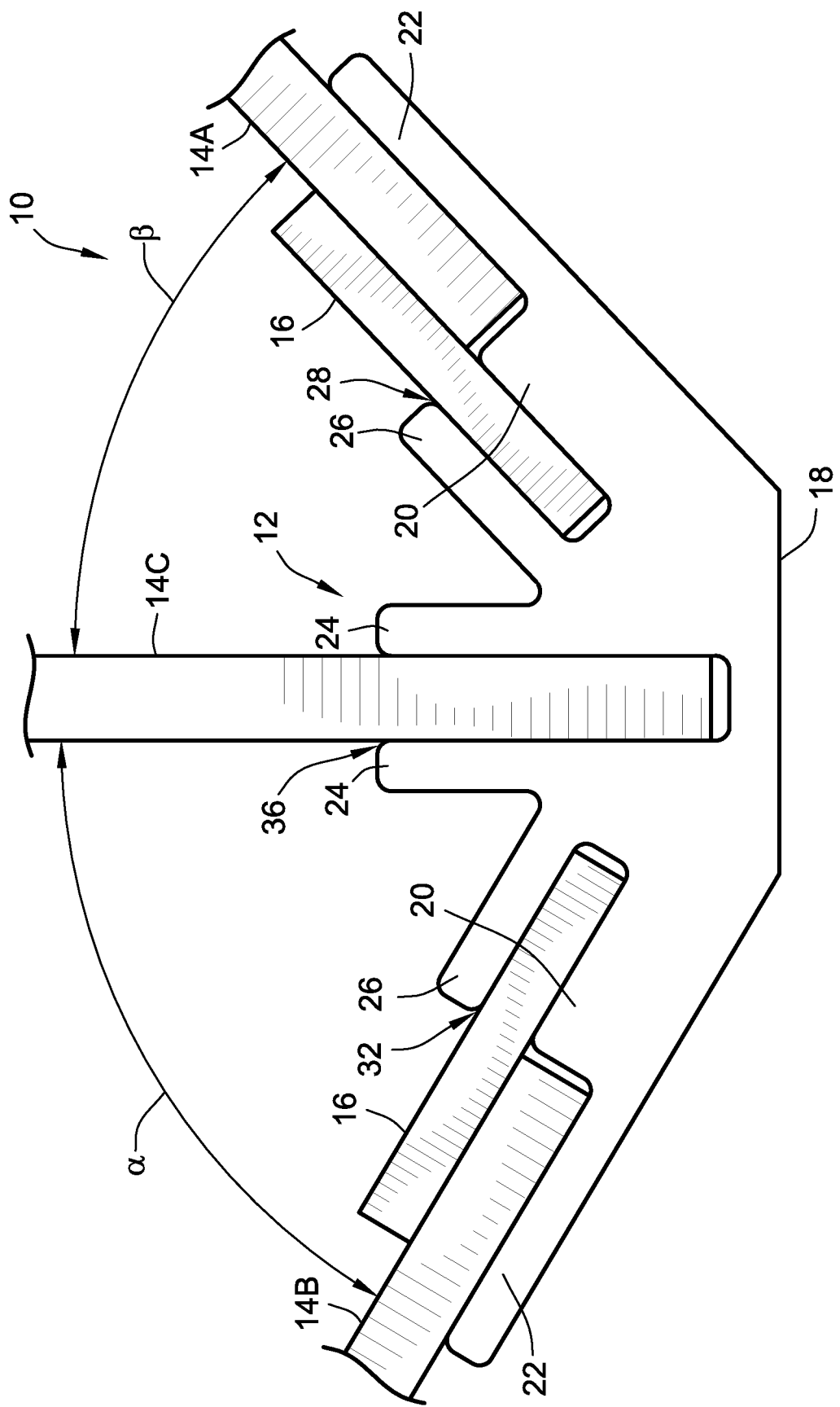
FIG. 7 depicts still further another embodiment of a slot bar, according to an exemplary embodiment.
Figure 8:
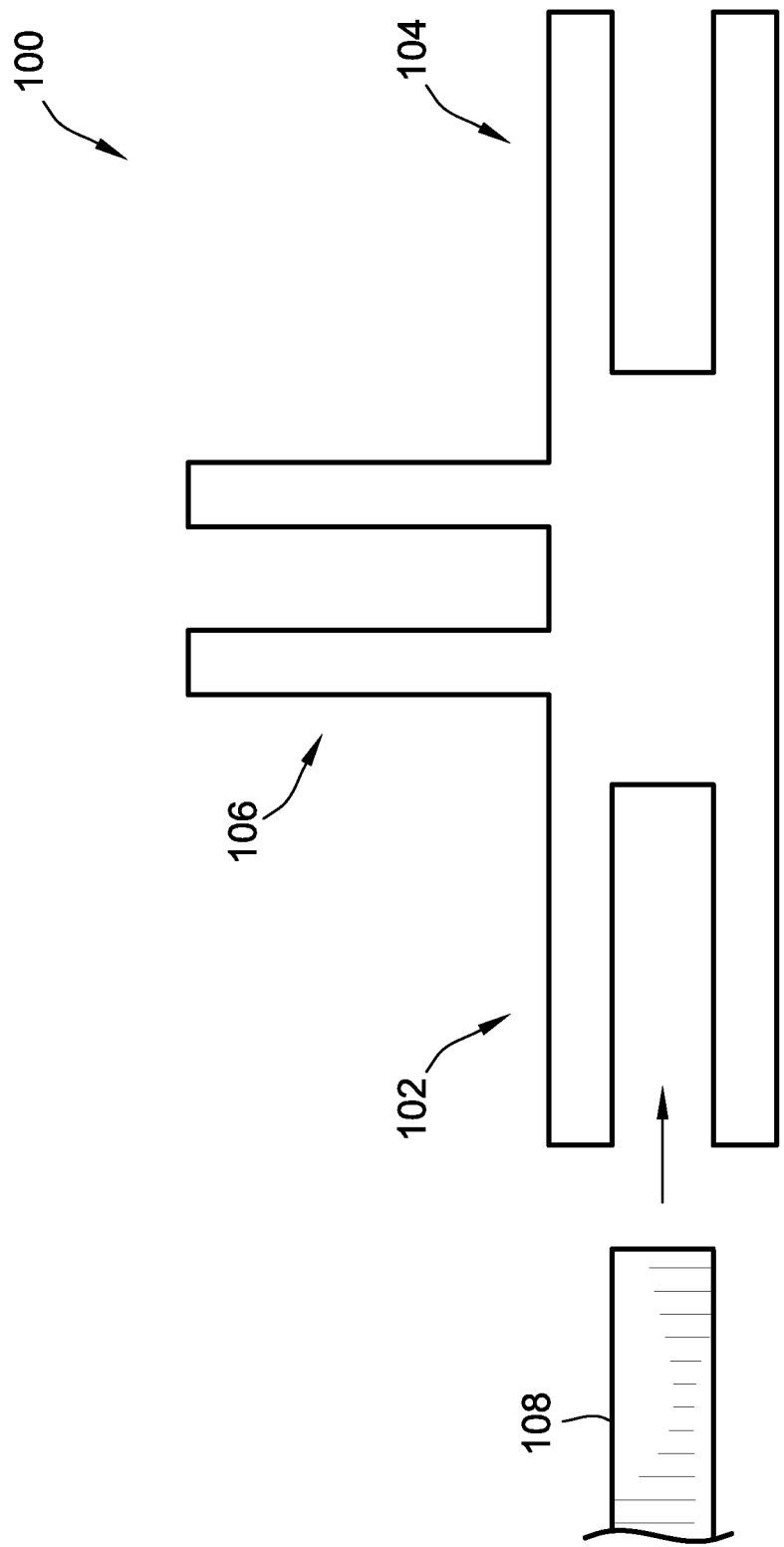
FIG. 8 is a prior art depiction of a joint for sheet material constructions.

The slot base 20 extends a height h above the base section 18 sufficient that a sheet material 14A can be placed or dropped onto the ledge region 22 and be substantially flush with the top of the slot base 20 as shown in FIG. 3. Once positioned on the ledge region 22, the sheet material 14 can be secured in place by inserting the retaining strip 16 into the first slot 28 as shown in FIG. 4. Because the retaining strip 16 has a smaller width than the sheet material 14, the retaining strip 16 is easier to insert into a slot than the sheet material 14, which may be limited in its positioning by obstructions at the opposite end of the sheet material 14. For example, a box shape construction would require slots at both ends into which the sheet material 14 would need to be inserted. However, after sliding one end of the sheet material 14 into a conventional slot joint (e.g., as shown in FIG. 7), there would be no room to maneuver the other end of the sheet material 14 to insert into a convention slot joint at that end.

Figure 5:
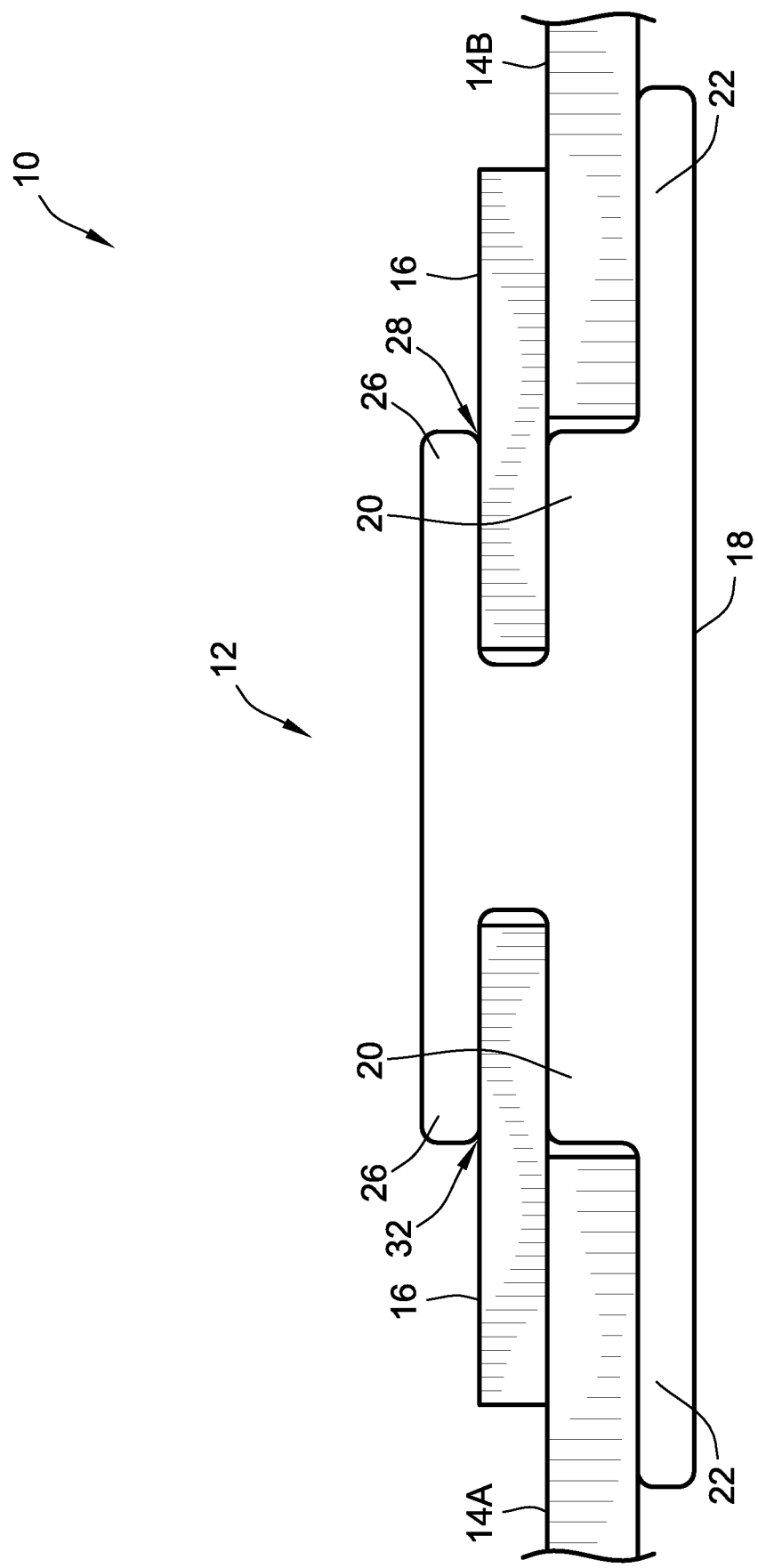
FIG. 5 depicts another embodiment of a slot bar, according to an exemplary embodiment.
Figure 6:
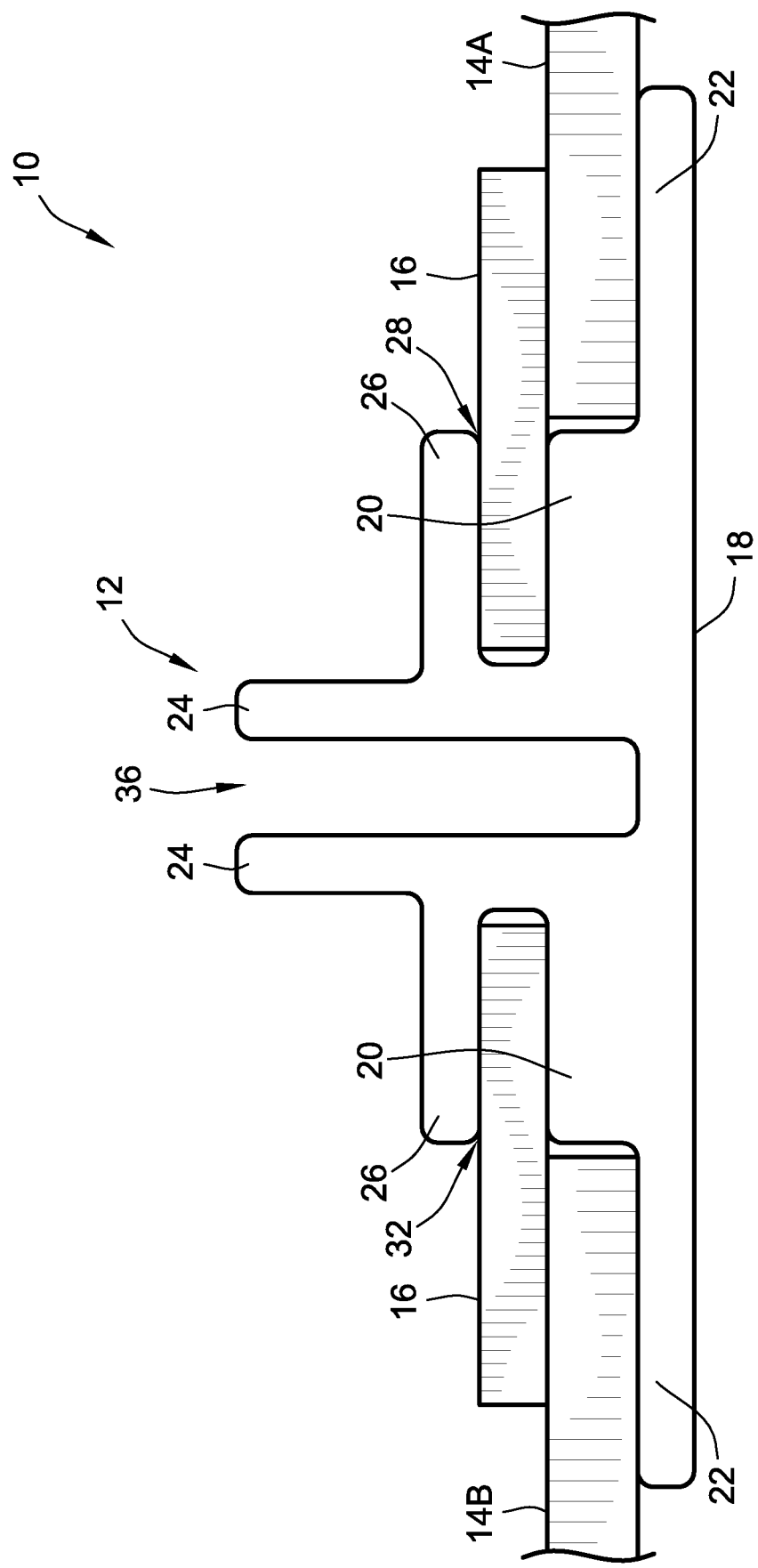
FIG. 6 depicts still another embodiment of a slot bar, according to an exemplary embodiment.

In embodiments, adhesive 34 can be used to secure the retaining strip 16 in the first slot 28, the retaining strip 16 to the sheet material 14, and the sheet material 14 to the ledge region 22. While the adhesive 34 is depicted as a relatively thick and uniform layer in FIG. 4, the adhesive 34 could be thinner and/or discontinuous. FIG. 5 provides another embodiment of a slot bar 12. As can be seen in FIG. 5, the slot bar 12 provides a first slot 28 and a second slot 32 that are coplanar. Thus, the slot bar 12 of FIG. 5 can be used to join two sheet materials 14 that are arranged in the same plane. In order to form the first slot 28 and the second slot 32, the base section 18 essentially includes an elongated slot base 20, and two slot arms 26 extend from the slot wall 24 in opposite directions while still both slot arms 26 being substantially perpendicular to the slot wall 24. Each of the sheet materials 14 are secured with a retaining strip 16. As with the previous embodiments, an adhesive (not shown) could also be used to secure the retaining strips 16 in the slots 28, 32. FIG. 6 provides still another embodiment of a slot bar 12. As can be seen in FIG. 6, this slot bar 12 provides three slots: the first slot 28, the second slot 32, and a third slot 36. The first slot 28 and second slot 32 are coplanar so as to secure two sheet materials 14 that are arranged in the same plane. Each of the two sheet materials 14 are secured with a retaining strip 16. The slot bar of FIG. 6 also provides the third slot 36 that is arranged substantially perpendicularly to the first slot 28 and the second slot 32. The third slot 36 is created by two slot walls 24 that are spatially disposed from each other. The third slot 36 can secure another sheet material 14. As with the previous embodiments, an adhesive (not shown) could also be used to secure the retaining strips 16 in the slots 28, 32.

Notwithstanding the foregoing, embodiments of the slot bar 12 are envisioned in which the first slot 28, second slot 32, and/or third slot 36 for receiving sheet materials 14A, 14B, and 14C, respectively, are not arranged substantially perpendicular to each other. For example, in embodiments, the angle between each of the slots 28, 32, 36 are acute, obtuse, or reflex (i.e., greater than 180° but less than 360°). A slot bar 12 substantially similar to the slot bar 12 depicted in FIG. 6 is provided in FIG. 7 with the only difference being that the slot bar 12 of FIG. 7 includes an angled first slot 28 and an angled second slot 32. In particular, the first slot 28 is angled with respect to the third slot 36 at a first angle α, and the second slot 32 is angled with respect to the third slot 36 at a second angle β. In embodiments, the first angle α and the second angle β are equal (and acute, right, obtuse, or reflex) such that the third slot 36 bisects the angle formed by the first slot 28 and the second slot 32. However, in other embodiments, the first angle α and the second angle β are not equal. In embodiments, the first angle α and the second angle β are each from 20° to 270°. While a slot bar 12 having three slots 28, 32, 36 is depicted, embodiments of a slot bar 12 having two slots 28, 32 (such as shown in FIGS. 1-5) and acute, obtuse, or reflex angles between the two slots 28, 32 are also envisioned.

As used herein, "substantially perpendicular" and "substantially parallel" mean within +/−20° of perpendicular or parallel, respectively. More preferably, "substantially perpendicular" and "substantially parallel" mean within +/−10° of perpendicular or parallel, respectively, and even more preferably, "substantially perpendicular" and "substantially parallel" mean within +/−5° of perpendicular or parallel, respectively. Most preferably, "substantially perpendicular" and "substantially parallel" mean within +/−2° of perpendicular or parallel, respectively.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A slot bar assembly comprising:
a first sheet material;
a first retaining strip; and
a slot bar comprising:
a base section defining at a first end region thereof a first ledge region having a surface;
a first slot base extending substantially perpendicularly from a region of the base section adjacent the first ledge region, the first slot base defining a surface parallel to the surface of the first ledge region;
a first slot wall extending from the surface of the first slot base;
a first slot arm extending from the first slot wall, the first slot arm being substantially parallel to and spatially disposed from the surface of the first slot base;
a first slot positioned between the first slot arm and the surface of the first slot base,
wherein the first slot receives the first retaining strip so as to secure opposite surfaces of the first sheet material between the first retaining strip and the surface of the first ledge region; and
a second slot wall that extends from the base section, wherein the second slot wall is spatially disposed from the first slot wall to define a second slot that receives a second sheet material.

2. The slot bar assembly of claim 1, wherein the first slot and the second slot are arranged substantially perpendicular to each other.

3. The slot bar assembly of claim 1, wherein the base section defines at a second end region thereof a second ledge region having a surface and further comprising:
a second slot base extending substantially perpendicularly from a region of the base section adjacent the second ledge region, the second slot base defining a surface parallel to the surface of the second ledge region;
the second slot wall extending from the surface of the second slot base:
a second slot arm extending from the second slot wall, the second slot arm being substantially parallel to and spatially disposed from the surface of the second slot base; and
a third slot positioned between the second slot arm and the surface of the second slot base,
wherein the third slot receives a second retaining strip so as to secure a third sheet material between the second retaining strip and the surface of the second ledge region.

4. The slot bar assembly of claim 3, wherein the first slot and the second slot are arranged at a first angle and the second slot and the third slot are arranged at a second angle and wherein the first angle and the second angle are from 20° to 270°.

5. The slot bar assembly of claim 4, wherein the first angle and the second angle are equal.

6. The slot bar assembly of claim 1, wherein the slot bar is an extruded piece.

7. A sheet material construction, comprising:
a first sheet material;
a second sheet material;
a first retaining strip; and
a slot bar configured to join the first sheet material and the second sheet material, the slot bar comprising:
a base section defining at a first end re ion thereof a first ledge region having a surface;
a first slot base extending substantially perpendicularly from a region of the base section adjacent the first ledge region, the first slot base defining a surface parallel to the surface of the first ledge region;
a first slot wall extending from the surface of the first slot base;
a first slot arm extending from the first slot wall, the first slot arm being substantially parallel to and spatially disposed from the surface of the first slot base;
a first slot positioned between the first slot arm and the surface of the first slot base,
wherein the first slot receives the first retaining strip so as to secure opposite sides of the first sheet material between the first retaining strip and the surface of the first ledge region; and
second slot wall that extends from the base section wherein the second slot well is spatially disposed from the first slot wall to define a second slot that receives the second sheet material.

8. The sheet material construction of claim 7, wherein the first slot and the second slot are arranged substantially perpendicular to each other.

9. The sheet material construction of claim 7, wherein the base section defines at a second end region thereof a second ledge region having a surface and further comprising;
a second slot base extending substantially perpendicularly from a region of the base section adjacent the second ledge region, the second slot base defining a surface parallel to the surface of the second ledge region;
the second slot wall extending from the surface of the second slot base:
a second slot arm extending from the second slot wall, the second slot arm being substantially parallel to and spatially disposed from the surface of the second slot base; and
a third slot positioned between the second slot arm and the surface of the second slot base;
wherein the third slot receives a second retaining strip so as to secure a third sheet material between the second retaining strip and the surface of the second ledge region.

10. The sheet material construction of claim 9, wherein the first slot and the second slot are arranged at a first angle and the second slot and the third slot are arranged at a second angle and wherein the first angle and the second angle are from 20° to 270°.

11. The sheet material construction of claim 10, wherein the first angle and the second angle are equal.

12. The sheet material construction of claim 7, wherein an adhesive is applied at at least one location selected from the group consisting of between the first slot arm and the first retaining strip, between the first retaining strip and the surface of the first slot base, between the first retaining strip and the first sheet material, and between the first sheet material and the surface of the first ledge region.

* * * * *